United States Patent Office 3,244,710
Patented Apr. 5, 1966

3,244,710
IODINE COMPLEXES OF HEXAMETHYLENE-
TETRAMINE QUATERNARY SALTS
Eric R. Larsen, Midland, Mich., assignor to The Dow
Chemical Company, Midland, Mich., a corporation of
Delaware
No Drawing. Filed Dec. 23, 1963, Ser. No. 332,954
9 Claims. (Cl. 260—248.5)

This invention relates to new compositions of matter. It relates particularly to complexes of iodine with certain quaternary salts, which complexes have been found to have unusual germicidal power.

Quaternary salts of hexamethylenetetramine with reactive organic halides are known to have bactericidal activity. Those salts formed with lower alkyl halides are also known to complex free iodine to make solids of definite composition and melting points. These complexes, in which the iodine is apparently physically bound, also have bactericidal activity comparable to the activity shown by the parent quaternary salts. Both the salts and these known complexes are of somewhat limited applicability as germicides and preservatives because of their relatively low activity against certain types of microorganisms, for example, the slime-molds and various fungi.

It has now been found that the iodine complexes of a particular class of quaternary salts of hexamethylenetetramine have unusually high activity against these more resistant microorganisms and show unexpected effectiveness against other microorganisms as well. These new materials are the complexes of iodine with hexamethylenetetramine quaternary salts of halogenated allyl halides of the formula $$C_nX_{2n-1}CH_2Y$$

wherein $n$ is 2 or 3, each X is hydrogen or halogen, preferably chlorine, bromine or iodine, at least one X being halogen, and Y is chlorine, bromine, or iodine. The compounds covered by the above formula are polyhalogenated propenes and butenes which contain the structure

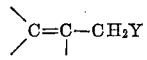

where the unsatisfied valence bonds are connected to hydrogen, halogen, methyl, or halomethyl radicals, there being at least one halogen containing radical and not more than one methyl or halomethyl group. Halides thereby included are compounds such as 2,3-dibromopropene, 1,3-dichloropropene, 1,1,2-trichloro-3-iodopropene, 1,1,3-trichloropropene, 1,1,2,3-tetrabromopropene, 1,2,3-trichloropene, 3 - bromo - 1 - chloro - 2 - fluoroprene. 3-bromo-2-(bromomethyl)propene, 1,4-dichloro - 2 - butene, 2-(chloromethyl)-3,3,3-trifluoropropene, and 4-chloro-1,1,1-trifluoro-2-butene. The quaternary salts themselves are ordinarily formed by the union of one molecule each of hexamethylenetetramine and organic halide, but in some cases, two or more molecules of hexamethylenetetramine are involved per molecule of halide.

Iodine is complexed with these salts in varying amounts, depending upon the conditions of the complexing reaction, particularly the relative proportion and concentration of free iodine in the reaction mixture. Complexes containing from 1 percent up to about 75 percent by weight of available iodine can be prepared. For germicidal or preservative use, complexes containing about 5–40 percent of complexed iodine are preferred.

These iodine complexes can be prepared merely by mixing iodine and the quaternary salt. Room temperature is preferred but higher or lower temperatures may be employed. Since the complexes usually begin to decompose at about 100° C., this temperature is a practical upper limit for the reaction. The complexing reaction is most conveniently carried out with the reactants dissolved in an inert mutual solvent such as carbon tetrachloride, ethyl alcohol, water, or aqueous KI solution. By suitably regulating the concentration of the reaction solution, the complex precipitates from solution as it forms and is easily separated in nearly quantitative yield. These materials are red to brown solids, soluble in organic solvents and somewhat less soluble in water, melting fairly sharply but with some decomposition at temperatures of about 100–200° C. The iodine is more or less loosely bound and is slowly leached from the complex by organic solvents or water.

The iodine complexes of the hexamethylenetetramine salts of polyhalopropenes are particularly preferred as preservatives for aqueous organic dispersions. The preparation of some representative complexes is illustrated by the following examples.

Example 1

Ten grams of the salt formed by the reaction of one mole of hexamethylenetetramine with one mole of 1,1,3-tribromopropene was added to a solution of 6.3 g. of iodine in 100 ml. of carbon tetrachloride. The resulting mixture was stirred for about two hours at room temperature. The reddish brown solid which had crystallized from the reaction mixture was separated by filtration and washed free of excess iodine with carbon tetrachloride. The air dried product weighed 12 g. It melted at 122–123° C. with decomposition taking place above its melting point. The complex was slowly soluble in cold water, very soluble in acetone and common organic solvents. Elemental analysis showed 19.45 percent C, 2.57 percent H, 9.98 percent N, 41.2 percent Br, and 26.0 percent I. This corresponds to about 1.2 atoms of iodine per molecule of the original quaternary salt. Infrared analysis was consistent with the postulated structure.

Example 2

By the procedure of Example 1, 10 g. of the salt of hexamethylenetetramine with 2,3-dibromopropene was reacted with excess iodine in CCl$_4$ solution. A crystalline product similar in appearance and properties to that of the previous example was obtained, weight 13 g., M.P. 120–125° C. (with decomposition).

Elemental analysis showed 23.43 percent C, 3.79 percent H, 12.52 percent N, 32.31 percent Br, and 27.05 percent I. This corresponds approximately to the formula $(C_6H_{12}N_4 \cdot C_3H_4Br_2)_2 \cdot I_2$.

Example 3

By the above procedure 10 g. of the hexamethylene salt of 1,1-dichloro-3-iodopropene was reacted with iodine to yield 14.5 g. of reddish crystals, M.P. 115–120° C. with decomposition. Elemental analysis of the product showed 19.57 percent C, 3.15 percent H, 9.77 percent N, 12.79 percent Cl, and 53.37 percent I, corresponding approximately to the formula $$(C_6H_{12}N_4 \cdot C_3H_3Cl_2I)_3 \cdot 2I_2$$

Examples 4–10

In the same way as described above, quaternary salts of hexamethylenetetramine with other polyhalogenated propenes were reacted with iodine to make similar iodine complexes. By varying the proportion of iodine to quaternary salt in the reaction mixture, complexes containing varying amounts of iodine were obtained. The complexes prepared, their properties, and their approximate molecular formulas as determined by elemental analysis are listed below.

| Hexamethylenetetramine, salt of— | Iodine complex formula | Complex melting point, °C. |
|---|---|---|
| 1,1,3-trichloropropene | $(C_6H_{12}N_4 \cdot C_3H_3Cl_3) \cdot 0.5I_2$ | [1] 110 |
| 3-bromo-1,1-dichloropropene | $(C_6H_{12}N_4 \cdot C_3H_3BrCl_2) \cdot 0.5I_2$ | [1] 120 |
| 1,1,2,3-tetrabromopropene | $(C_6H_{12}N_4 \cdot C_3H_2Br_4) \cdot 1.3I_2$ | [1] 100–130 |
| 1-bromo-1,2,3-trichloropropene | $[(C_6H_{12}N_4)_5 \cdot C_6H_{12}N_4 \cdot C_3H_2BrCl_3] \cdot 2.7I_2$ | [1] 120–130 |
| 1,3-dichloropropene | $(C_6H_{12}N_4 \cdot C_3H_4Cl_2) \cdot 0.09I_2$ | [1] 172–185 |
| 1,3-dichloropropene | $(C_6H_{12}N_4 \cdot C_3H_4Cl_2) \cdot 0.2I_2$ | [1] 165–175 |
| 1,3-dichloropropene | $(C_6H_{12}N_4 \cdot C_3H_4Cl_2) \cdot 0.4I_2$ | [1] 155–170 |

[1] Decomposition.

Iodine complexes having similar properties are obtained by reacting iodine with the hexamethylenetetramine quaternary salts of other polyhalogenated propenes and butenes such as 3-bromo-1-chloro-2-fluoropropene, 1-bromo-4-chloro-2-butene, 3-bromo-2-(bromomethyl)-2-butene, 2-(chloromethyl)-3,3,3-trifluoropropene, 4-chloro-1,1,1-trifluoro-2-butene, 2,3-dibromo-1,4-diiodo-2-butene, and the like. These complexes can be prepared so as to contain widely different proportions of iodine by varying the concentration and proportion of iodine in the reaction mixture. In this way, complexes containing from 1 percent to about 75 percent by weight of complexed iodine can be made. The exact nature of the bond holding this complexed iodine is not clearly understood, nor is it known whether all of that iodine is bound in exactly the same way.

These complexes are of particular value when incorporated as preservatives in aqueous organic dispersions such as wood pulp suspensions, soluble oil emulsions, organic polymer latex dispersions, and aqueous adhesive formulations which are subject to microbial attack. They are effective in concentrations as low as ten parts per million by weight in preventing bacterial spoilage and the formation of slimes in such compositions. Concentrations of 50–1000 p.p.m. of complex are ordinarily used.

Although these complexes are combinations of two known bactericides, i.e., iodine and the hexamethylenetetramine salt, the complexes derived from the polyhalopropenes and butenes, as defined above, show activity which is greater than would be expected on the basis of the activities shown by their component parts. This unexpected activity is shown in Example 11 for an iodine complex of the salt of 1,3-dichloropropene with hexamethylenetetramine.

*Example 11*

The hexamethylenetetramine salt of 1,3-dichloropropene was reacted with iodine as described above to make a crystalline complex containing 12 percent by weight of iodine. This complex, iodine alone, and the hexamethylenetetramine salt of 1,3-dichloropropene were all tested separately for activity against the organism *Pseudomonas aeruginosa* by the same test method. Samples of liquid nutrient agar in which *Pseudomonas aeruginosa* was cultured were mixed with various quantities of test material, the agar mixtures were allowed to harden in test dishes, and these were incubated at 30° C. They were observed for signs of bacterial growth at 24 and 48 hours of incubation. The results are listed below.

| Material | Conc., p.p.m. | Results |
|---|---|---|
| Iodine | 100 | No growth. |
|  | 50 | Growth. |
| Hexamethylenetetramine salt of 1,3-dichloropropene | 500 | No growth. |
|  | 250 | Growth. |
| Iodine complex of salt (12% I₂) | 100 | No growth. |
|  | 50 | Growth. |

It is seen that while 500 p.p.m. of the salt or 100 p.p.m. of pure iodine are required to prevent bacterial growth, a concentration of the iodine complex of that salt which represents only 88 p.p.m. of the salt and 12 p.p.m. of iodine is sufficient.

When the same complex was tested by this method against *Staphylococcus aureus*, 100 p.p.m. of the complex was found to be sufficient to prevent bacterial growth while 250 p.p.m. of iodine alone was required. Similar results were found upon testing other iodine complexes of the class described herein against these and other organisms. For example, the hexamethylenetetramine-1,1,3-tribromopropene iodine complex of Example 1 was found to be an effective slimicide in concentrations as low as 10 p.p.m.

I claim:

1. An iodine complex of the hexamethylenetetramine quaternary salt of a halogenated allyl halide of the formula $$C_nX_{2n-1}CH_2Y$$

wherein *n* is an integer from 2 to 3, each X is selected from the group consisting of hydrogen and halogen, at least one X being halogen, and Y is halogen of atomic number from 17 to 53 inclusive, said complex containing about 1–75 percent by weight of complexed iodine.

2. The complex of claim 1 wherein the halide is 1,3-dichloropropene.

3. The complex of claim 1 wherein the halide is 1-bromo-1,2,3-trichloropropene.

4. The complex of claim 1 wherein the halide is 1,1,2,3-tetrabromopropene.

5. The complex of claim 1 wherein the halide is 3-bromo-1,1-dichloropropene.

6. The complex of claim 1 wherein the halide is 1,1,3-trichloropropene.

7. The complex of claim 1 wherein the halide is 1,1-dichloro-3-iodopropene.

8. The complex of claim 1 wherein the halide is 2,3-dibromopropene.

9. The complex of claim 1 wherein the halide is 1,1,3-tribromopropene.

References Cited by the Examiner

UNITED STATES PATENTS

| | | | |
|---|---|---|---|
| 567,968 | 9/1896 | Eichengrun | 260—248.5 |
| 1,226,394 | 5/1917 | Slater | 260—248.5 |
| 2,019,121 | 10/1935 | De Rewal | 167—22 |
| 2,607,759 | 8/1952 | Yourtee | 260—248.5 X |
| 2,853,414 | 9/1958 | Wimmer | 167—22 |
| 2,917,428 | 12/1959 | Hitzman | 167—22 |

OTHER REFERENCES

Sperziale et al., "J. Am. Chem. Soc.," volume 78, pages 2556–59 (1956).

WALTER A. MODANCE, *Primary Examiner.*

NICHOLAS S. RIZZO, M. W. WESTERN, JAMES D. FORD, *Assistant Examiners.*